US012202258B2

(12) United States Patent
Tokuda et al.

(10) Patent No.: US 12,202,258 B2
(45) Date of Patent: Jan. 21, 2025

(54) PRINTING APPARATUS

(71) Applicant: SEIKO EPSON CORPORATION, Tokyo (JP)

(72) Inventors: Takeshi Tokuda, Shiojiri (JP); Rikuo Yamada, Yamagata-mura (JP); Takehiro Kobayashi, Matsumoto (JP); Hideaki Nishijima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/053,474

(22) Filed: Nov. 8, 2022

(65) Prior Publication Data

US 2023/0067797 A1 Mar. 2, 2023

Related U.S. Application Data

(63) Continuation of application No. 17/004,393, filed on Aug. 27, 2020, now Pat. No. 11,491,809.

(30) Foreign Application Priority Data

Aug. 30, 2019 (JP) ................................. 2019-157883

(51) Int. Cl.
*B41J 15/04* (2006.01)
*B41J 2/32* (2006.01)
(Continued)

(52) U.S. Cl.
CPC ............... *B41J 15/046* (2013.01); *B41J 2/32* (2013.01); *B41J 3/36* (2013.01); *B41J 3/4075* (2013.01); *B41J 15/044* (2013.01)

(58) Field of Classification Search
CPC ...... B41J 15/046; B41J 15/044; B41J 3/4075; B41J 3/36; B41J 2/32
See application file for complete search history.

(56) References Cited

U.S. PATENT DOCUMENTS 9,862,205 B2 1/2018 Obara
9,908,731 B2 3/2018 Morishita et al.
(Continued)

FOREIGN PATENT DOCUMENTS

JP 05-085652 11/1993
JP H05-085652 U 11/1993
(Continued)

*Primary Examiner* — Justin Seo
*Assistant Examiner* — Kendrick X Liu
(74) *Attorney, Agent, or Firm* — WORKMAN NYDEGGER

(57) ABSTRACT

A printing apparatus includes: a roll sheet container that contains a roll sheet around which a recording sheet is wound; a first sheet guide that makes contact with a first surface of the recording sheet; a second sheet guide that makes contact with a second surface of the recording sheet; and a transport roller that transports the recording sheet. The first and second sheet guides are disposed so as to face each other to form a sheet route along which the recording sheet is to pass. The transport roller transports the recording sheet that passed along the sheet route. The second sheet guide includes: a projection that protrudes toward the roll sheet container; and a pushing section that extends from the projection along an outer circumference of the roll sheet and in a direction away from the first sheet guide.

3 Claims, 5 Drawing Sheets

(51) Int. Cl.

| | |
|---|---|
| ***B41J 3/36*** | (2006.01) |
| ***B41J 3/407*** | (2006.01) |

(56) References Cited

U.S. PATENT DOCUMENTS

| | | | | |
|---|---|---|---|---|
| 11,285,743 | B2 | 3/2022 | Oguchi et al. | |
| 2015/0151940 | A1* | 6/2015 | Morishita | B41J 15/046<br>242/615 |
| 2017/0121142 | A1* | 5/2017 | Hagi | B41J 15/04 |
| 2017/0266996 | A1 | 9/2017 | Obara | |
| 2018/0250962 | A1* | 9/2018 | Oguchi | B41J 11/70 |
| 2021/0031545 | A1* | 2/2021 | Kawaguchi | B41J 2/3355 |

FOREIGN PATENT DOCUMENTS

| | | | |
|---|---|---|---|
| JP | 06-127078 | | 5/1994 |
| JP | H09-0254473 | A | 9/1997 |
| JP | 2007-160652 | | 6/2007 |
| JP | 2007-160652 | A | 6/2007 |
| JP | 2014-069376 | | 4/2014 |
| JP | 2016-016620 | A | 2/2016 |
| JP | 2016-028975 | | 3/2016 |
| JP | 2017-052180 | | 3/2017 |

* cited by examiner

PRINTING APPARATUS

This application is a continuation of U.S. patent application Ser. No. 17/004,393, filed Aug. 27, 2020, entitled "PRINTING APPARATUS," and which issued as U.S. Pat. No. 11,491,809 on Nov. 8, 2022, which claims priority from JP Application Serial Number 2019-157883, filed Aug. 30, 2019, the disclosure of which is hereby incorporated by reference herein in its entirety.

BACKGROUND

1. Technical Field

The present disclosure relates to printing apparatuses.

2. Related Art

Various types of printing apparatuses in which images are printed on recording sheets fed from roll sheets have been studied and developed.

With regard to the above, JP-A-2007-160652 discloses a printing apparatus having a sheet guide that guides a recording sheet fed from a roll sheet by making contact with the recording sheet.

In a printing apparatus of the above type, a transport roller rotates to feed a recording sheet from a roll sheet stored in a roll sheet container. However, if the recording sheet wound around the roll sheet develops slack in the roll sheet container, a slack portion may jam the transport roller, in which case the transport roller can no longer rotate.

SUMMARY

According to an aspect of the present disclosure, a printing apparatus includes: a roll sheet container configured to contain a roll sheet around which a recording sheet is wound; a first sheet guide configured to make contact with a first surface of the recording sheet; and a second sheet guide configured to make contact with a second surface of the recording sheet. The second sheet guide includes: a projection configured to protrude toward the roll sheet container; and a pushing section formed along an outer circumference of the roll sheet and configured to extend from the projection in a direction away from the first sheet guide. The second sheet guide is disposed so as to face the first sheet guide to form a sheet route for the recording sheet. The printing apparatus further includes a transport roller configured to transport the recording sheet that passed the sheet route.

The printing apparatus may further include a cover that covers or exposes the roll sheet container. Both the second sheet guide and the transport roller may be disposed on the cover. When the cover is closed, the first sheet guide and the second sheet guide may face each other to form the sheet route.

The printing apparatus may further include a third sheet guide that partly covers a surface of the transport roller. The third sheet guide may be disposed downstream of the second sheet guide in a transport direction of the recording sheet.

In the printing apparatus, a surface of the first sheet guide which faces the recording sheet may be at least partly curved along a surface of the second sheet guide which faces the recording sheet. The surface of the second sheet guide which faces the recording sheet may be curved so as to be further from the transport roller on a downstream side in the transport direction compared with an upstream side in the transport direction. A surface of the third sheet guide which faces the recording sheet may be curved along the outer circumference of the transport roller.

In the printing apparatus, when making contact with the recording sheet being transported by the transport roller, the first sheet guide may move away from the second sheet guide.

DESCRIPTION OF EXEMPLARY EMBODIMENTS

Embodiment

Some embodiments of the present disclosure will be described below with reference to the accompanying drawings.

Configuration of Printing Apparatus

A printing apparatus 1 according to one embodiment will be described below.

Figure 1:
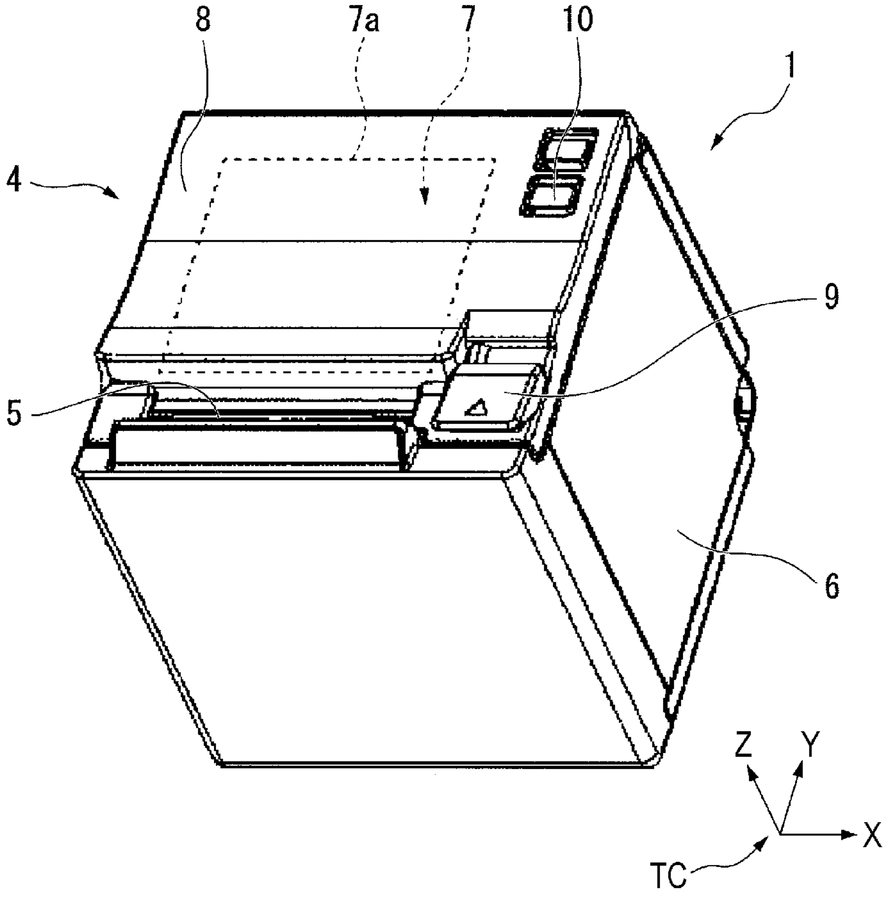
FIG. 1 is a perspective view of a printing apparatus according to an embodiment of the present disclosure.
Figure 2:
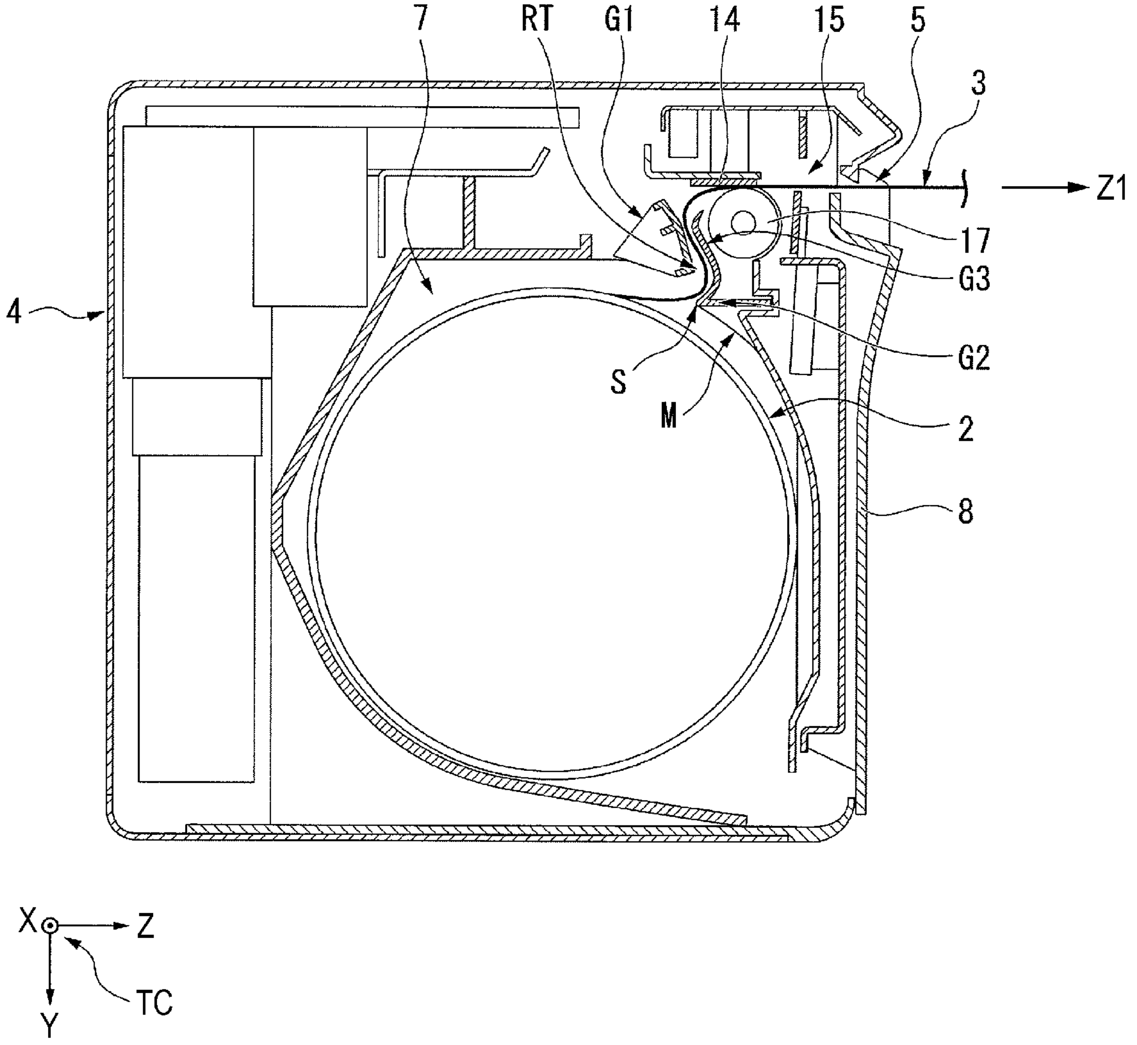
FIG. 2 is a schematic cross-sectional view of the printing apparatus illustrated in FIG. 1.

FIG. 1 is a perspective view of the printing apparatus 1; FIG. 2 is a schematic cross-sectional view of the printing apparatus 1.

The printing apparatus 1 may be a roll-sheet printer that feeds a recording sheet 3 having an elongated shape from a roll sheet 2 and then prints an image on the recording sheet 3. The roll sheet 2 is stored in the printing apparatus 1, and the recording sheet 3 is wound around the roll sheet 2. As illustrated in FIG. 1, the printing apparatus 1 includes a printer housing 4 having an overall rectangular parallelepiped shape. The printer housing 4 is provided with an ejection hole 5 via which the recording sheet 3 is to be ejected to the outside of the printing apparatus 1.

Each of the drawings employs a three-dimensional (3D) orthogonal coordinate system, which is equivalent to a 3D coordinate system TC in which individual directions are defined. Hereinafter, for the sake of explanation, the X-axis in the 3D coordinate system TC is referred to simply as the X-axis; the Y-axis in the 3D coordinate system TC is referred to simply as the Y-axis; and the Z-axis in the 3D coordinate system TC is referred to simply as the Z-axis.

Hereinafter, for the sake of explanation with reference to FIG. 1, the surface of the printer housing 4 on which the ejection hole 5 is formed is referred to as the upper surface, and the opposite surface is referred to as the lower surface. Of two directions orthogonal to the upper and lower surfaces, one from the lower surface toward the upper surface is referred to as an upward direction or simply as upward, and the remaining one is referred to as a downward direction or simply as downward. As an example, the following description will be given on the precondition that the upward direction coincides with the +Z direction, as illustrated in FIG. 1.

Hereinafter, for the sake of explanation, two directions parallel to the central axis of the roll sheet 2 stored in the printing apparatus 1 are referred to as width directions of the printing apparatus 1 or simply as the width directions. Two directions orthogonal to the upward, downward, and width directions are referred to as front-back directions of the printing apparatus 1 or simply as the front-back directions. Of the surfaces of the printer housing 4 which intersect the front-back directions, one closer to the ejection hole 5 is referred to as a front surface, and the remaining surface is referred to as the back surface. Of the front-back directions, one from the back surface toward the front surface is referred to as a forward direction or simply as forward, and the remaining one is referred to the backward direction or simply as backward. As an example, the following description will be given in the precondition that the backward direction coincides with the +Y direction, as illustrated in FIG. 1. In this case, the +X direction, which is expressed as the direction of the vector product of the +Y and +Z vectors, coincides with one of the width directions. Further, one of the width directions which coincides with the +X direction is referred to as a rightward direction or simply as rightward, and the remaining one is referred to as the leftward direction or simply leftward.

In the printing apparatus 1 illustrated in FIG. 1, the ejection hole 5 is formed in a front portion of the upper surface of the printer housing 4. The ejection hole 5 is elongated in the rightward and leftward directions.

The printer housing 4 includes: a case body 6 having a box shape; and an opening/closing door 8 attached to an upper portion of the case body 6. The case body 6 contains a roll sheet container 7 in which the roll sheet 2 is stored. The opening/closing door 8 covers a roll sheet input hole 7*a* of the roll sheet container 7 from the top.

The opening/closing door 8 is disposed in the back of the ejection hole 5. Disposed on the right of the opening/closing door 8 is an opening/closing lever 9. Disposed in the back of the opening/closing lever 9 is a power switch 10. By operating the opening/closing lever 9, the opening/closing door 8 can be unlocked. Once unlocked, the opening/closing door 8 is rotatable around a shaft that extends in the rightward and leftward directions on the rear side of the opening/closing door 8. When in a horizontal position, the opening/closing door 8 covers the roll sheet container 7, whereas when in an upright position, the opening/closing door 8 exposes the roll sheet container 7. In short, the opening/closing door 8 covers or exposes the roll sheet container 7. It should be noted that in FIG. 1, the opening/closing door 8 in the horizontal position covers the roll sheet container 7. Herein, the opening/closing door 8 is an example of a cover.

The printer housing 4 contains a print head 14 and a cutter 15. Moreover, in the printer housing 4, a transport route is formed from the roll sheet container 7 to the ejection hole 5 with a printing site and a cutting site therebetween. The printing site may be a midway point on the transport route at which the print head 14 is to print an image on the recording sheet 3. The cutting site may be another midway point on the transport route at which the cutter 15 is to cut the recording sheet 3.

The print head 14 may be a thermal head. The printing site is defined by a platen roller 17 disposed so as to face the print head 14. The platen roller 17 receives rotational power from a transport motor (not illustrated in FIG. 1 or 2). Both the platen roller 17 and the transport motor constitute a transport mechanism for transporting the recording sheet 3 along the transport route. Herein, the platen roller 17 is an example of a transport roller.

The printing apparatus 1 drives the print head 14 to print an image on the recording sheet 3 passing through the printing site. Then, the printing apparatus 1 drives the cutter 15 to cut the printed portion of the recording sheet 3. In this case, the cutter 15 may either partly or fully cut the printed portion of the recording sheet 3.

The printing apparatus 1 drives the transport motor to rotate the platen roller 17, thereby transporting, at a constant speed and in a transport direction Z1, the recording sheet 3 that has been placed on the transport route. As illustrated in FIG. 1, the transport direction Z1 refers to the direction in which the recording sheet 3 is to be transported along the transport route.

The printing apparatus 1 further includes a first sheet guide G1 and a second sheet guide G2, both of which at least partly form the route from the roll sheet 2 to the printing site. More specifically, the first sheet guide G1 and the second sheet guide G2 are arranged so as to face each other, thereby forming a route, called a sheet route RT, along which the recording sheet 3 is to pass. In this case, the first sheet guide G1 and the second sheet guide G2 have opposing surfaces that at least partly form the sheet route RT. Further, the opposing surfaces are spaced sufficiently far away from each other to enable the recording sheet 3 to pass therebetween. Optionally, one or both of the opposing surfaces may have one or more recesses. More specifically, for example, one or both of the opposing surfaces may have a plurality of ribs arranged at predetermined intervals.

The first sheet guide G1, the opposing surface of which at least partly forms the sheet route RT as described above, is a member that makes contact with a first surface of the recording sheet 3 passing along the sheet route RT. The first surface of the recording sheet 3 corresponds to the surface of the recording sheet 3 on which an image is to be printed at the above printing site. The first sheet guide G1 is also a member pivotable around a shaft (not illustrated) extending in the width directions of the printing apparatus 1. The first sheet guide G1 is biased by a biasing member, such as a spring, toward the first surface of the recording sheet 3 passing along the sheet route RT. When making contact with the recording sheet 3 being transported by the platen roller 17, the first sheet guide G1 is moved away from the second sheet guide G2 by a force applied by the recording sheet 3 to the first sheet guide G1. In other words, the first sheet guide G1 is pivoted around the shaft and away from the second sheet guide G2 by the force applied by the recording sheet 3 to the first sheet guide G1. In this way, the printing apparatus 1 effectively reduces a variation in inertial load on the recording sheet 3 being transported by the platen roller 17.

Figure 3:
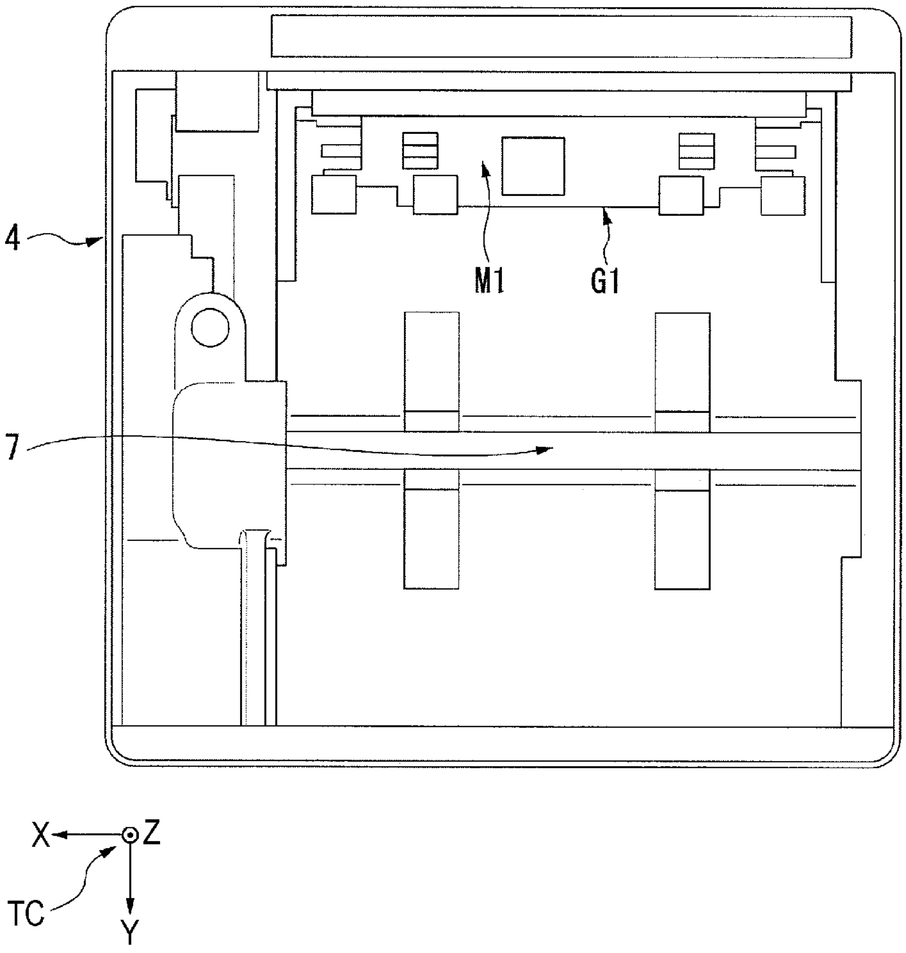
FIG. 3 is a top view of the printing apparatus with the opening/closing door detached.

FIG. 3 is a top view of the printing apparatus 1 with the opening/closing door 8 detached. It should be noted that in FIG. 3, the roll sheet 2 is not contained in the roll sheet container 7. As illustrated in FIG. 3, the first sheet guide G1 is disposed in front of and above the roll sheet container 7. In FIG. 3, a surface M1 of the first sheet guide G1 is an example of the surface of the first sheet guide G1 which at least partly forms the sheet route RT.

The surface of the first sheet guide G1 which faces the recording sheet 3 is at least partly curved along the surface of the second sheet guide G2 which faces the recording sheet 3.

The surface of the second sheet guide G2 which faces the recording sheet 3 is curved so as to be further from the platen roller 17 on its downstream side in the transport direction Z1 compared with its upstream side in the transport direction Z1. In this way, the printing apparatus 1 can ensure the length of the sheet route RT in the transport direction Z1. As a result, even if the roll sheet 2 develops slack in the printing apparatus 1, the slack portion is less likely to jam the rotating platen roller 17 along the sheet route RT, details of which will be described later.

The second sheet guide G2 has a projection S (a protruding section) and a pushing section M.

The projection S is a part of the second sheet guide G2 which protrudes toward the roll sheet container 7. With the projection S, even if the roll sheet 2 develops slack in the printing apparatus 1, the slack portion is less likely to be fed to the sheet route RT.

The end of the projection S may be either sharp or rounded; however, it is preferably rounded. One reason is that, when the roll sheet 2 that has been wound around the recording sheet 3 in a slack fashion is fed therefrom and makes contact with the projection S, this portion is less likely to crease or become damaged. It should be noted that the projection S is optional and thus does not necessarily have to be formed in the second sheet guide G2.

The pushing section M is a part of the second sheet guide G2 which extends from the projection S in a direction away from the first sheet guide G1 and along the outer circumference of the roll sheet 2. When the roll sheet 2 develops slack in the printing apparatus 1, the pushing section M pushes the slack portion toward the outer circumference of the roll sheet 2 together with the projection S, thereby reliably suppressing the slack portion from being fed to the sheet route RT. Optionally, the pushing section M may have one or more recesses. More specifically, for example, the pushing section M may have a plurality of ribs arranged at predetermined intervals. It should be noted that the pushing section M is optional and thus does not necessarily have to be formed in the second sheet guide G2.

As illustrated in FIG. 2, the second sheet guide G2 provided with the projection S and the pushing section M is disposed on the opening/closing door 8 together with the platen roller 17. When the opening/closing door 8 covers the roll sheet container 7, the first sheet guide G1 and the second sheet guide G2 face each other to form the sheet route RT. Slackening of the roll sheet 2 is a phenomenon that may occur only when the opening/closing door 8 covers the roll sheet container 7. Thus, in the printing apparatus 1, when the opening/closing door 8 covers the roll sheet container 7, both the first sheet guide G1 and the second sheet guide G2 suppress a slack portion of the roll sheet 2 from being fed to the sheet route RT. In this way, the printing apparatus 1 suppresses the slack portion from jamming the platen roller 17. Consequently, the printing apparatus 1 successfully reduces the risk of the platen roller 17 failing to rotate due to the slack portion jamming the platen roller 17.

The printing apparatus 1 further includes a third sheet guide G3 that partly covers the platen roller 17. As illustrated in FIG. 2, the third sheet guide G3 is disposed on the opening/closing door 8 together with both the platen roller 17 and the second sheet guide G2. In the printing apparatus 1, as illustrated in FIG. 2, the third sheet guide G3 is disposed downstream of the second sheet guide G2 in the transport direction Z1 of the recording sheet 3. The surface of the third sheet guide which faces the recording sheet 3 is curved along the outer circumference of the platen roller 17. In this way, the printing apparatus 1 can suppress the sheet route RT from being excessively long. In addition, even if a slack portion of the roll sheet 2 in the printing apparatus 1 is fed to the sheet route RT when the opening/closing door 8 covers the roll sheet container 7, the third sheet guide G3 suppresses the slack portion from jamming the platen roller 17. Consequently, the printing apparatus 1 reliably and successfully reduces the risk of the platen roller 17 failing to rotate due to the slack portion jamming the platen roller 17. It should be noted that the third sheet guide G3 is optional and thus does not necessarily have to be formed in the printing apparatus 1.

Figure 4:
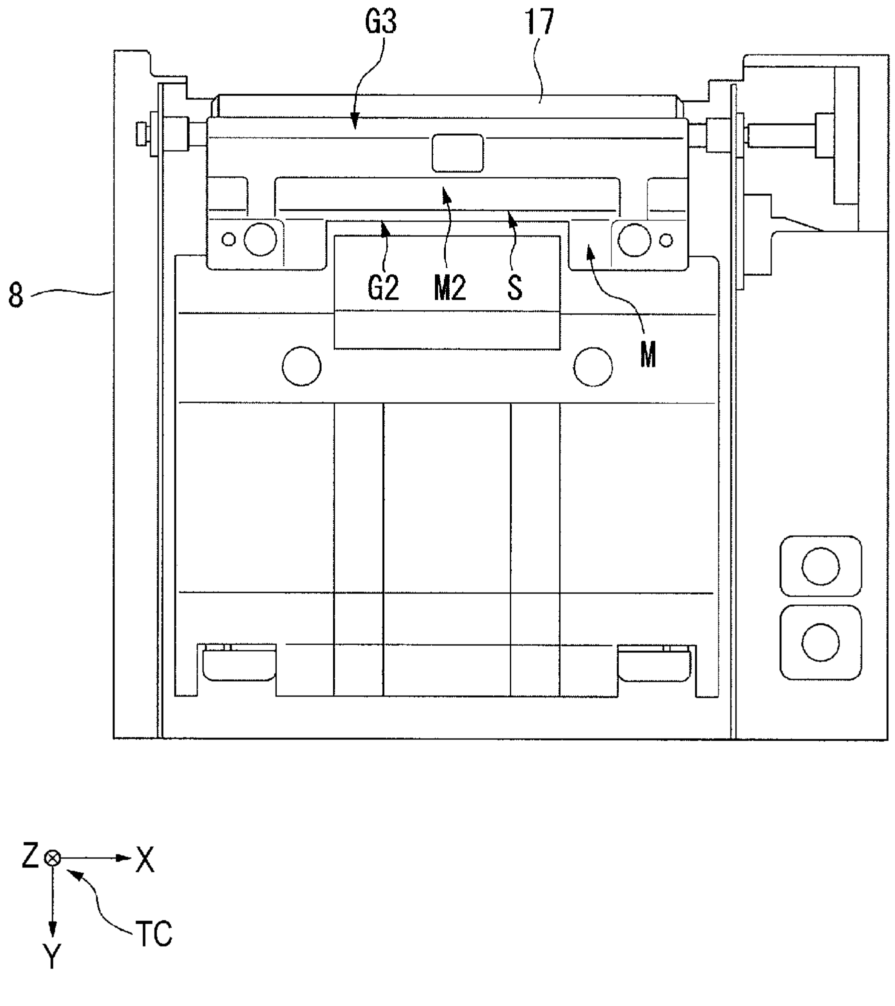
FIG. 4 is a bottom view of the opening/closing door in the printing apparatus illustrated in FIG. 1 with the printer housing detached.

FIG. 4 is a bottom view of the opening/closing door 8 in the printing apparatus 1 illustrated in FIG. 1 with the printer housing 4 detached. As illustrated in FIG. 4, both the second sheet guide G2 and the third sheet guide G3 are disposed in an upper rear portion of the opening/closing door 8 with the platen roller 17 therebetween. In FIG. 4, a surface M2 of the second sheet guide G2 is an example of the surface of the second sheet guide G2 which at least partly forms the sheet route RT.

Figure 5:
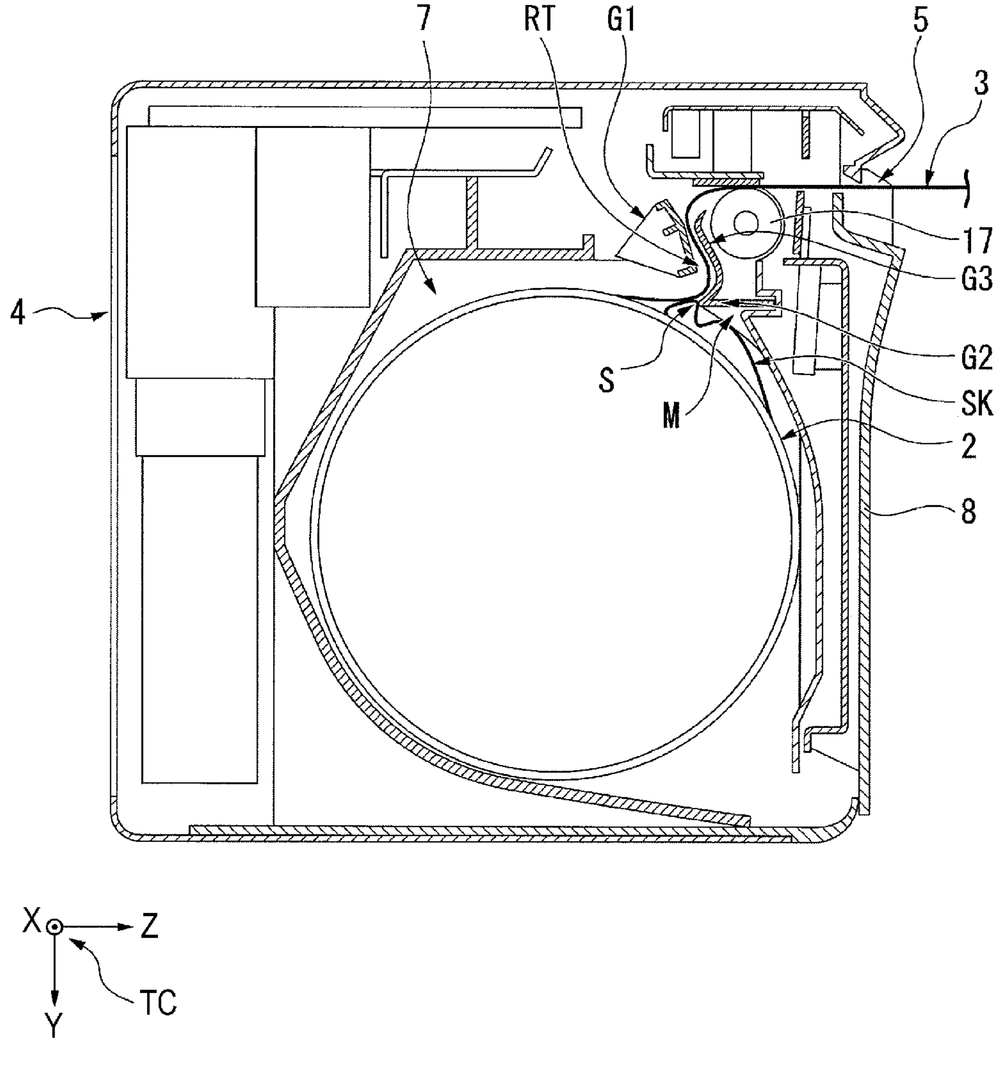
FIG. 5 is a schematic cross-sectional view of the printing apparatus in which the roll sheet has developed slack.

FIG. 5 is a schematic cross-sectional view of the printing apparatus 1 in which the roll sheet 2 has developed slack. In FIG. 5, a slack portion SK is an example of a slack portion of the roll sheet 2. In the printing apparatus 1, as illustrated in FIG. 5, the slack portion SK is not fed to the sheet route RT because it is pushed toward the outer circumference of the roll sheet 2 by both the projection S and the pushing section M of the second sheet guide G2. Nevertheless, the slack portion SK may be fed to the sheet route RT in the printing apparatus 1. In this case, both the curved surface of the first sheet guide G1 which faces the recording sheet 3 and the curved surface of the second sheet guide G2 which faces the recording sheet 3 hinder the slack portion SK from approaching the outer circumference of the platen roller 17. Nevertheless, the slack portion SK that has been fed to the sheet route RT may approach the outer circumference of the platen roller 17. In this case, the third sheet guide G3 hinders the slack portion SK from making contact with the outer circumference of the platen roller 17. Consequently, the printing apparatus 1 successfully reduces the risk of the platen roller 17 failing to rotate due to the slack portion jamming the platen roller 17.

As described above, a printing apparatus according to this embodiment includes: a roll sheet container that contains a roll sheet around which a recording sheet is wound; a first sheet guide that makes contact with a first surface of the recording sheet; a second sheet guide that makes contact with a second surface of the recording sheet; and a transport roller that transports the recording sheet. The first and second sheet guides are disposed so as to face each other to form a sheet route along which the recording sheet is to pass. The transport roller transports the recording sheet that passed along the sheet route. The second sheet guide includes: a projection that protrudes toward the roll sheet container; and a pushing section that extends from the projection along an outer circumference of the roll sheet and in a direction away from the first sheet guide. With this configuration, the printing apparatus successfully reduces the risk of the transport roller failing to rotate.

The printing apparatus may further include a cover that covers or exposes the roll sheet container. Both the second sheet guide and the transport roller may be disposed on the cover. When the cover is closed, the first sheet guide and the second sheet guide may face each other to form the sheet route.

The printing apparatus may further include a third sheet guide that partly covers a surface of the transport roller. The third sheet guide may be disposed downstream of the second sheet guide in a transport direction of the recording sheet.

In the printing apparatus, a surface of the first sheet guide which faces the recording sheet may be at least partly curved along a surface of the second sheet guide which faces the recording sheet. The surface of the second sheet guide which faces the recording sheet may be curved so as to be further from the transport roller on a downstream side in the transport direction compared with an upstream side in the transport direction. A surface of the third sheet guide which faces the recording sheet may be curved along the outer circumference of the transport roller.

In the printing apparatus, when making contact with the recording sheet being transported by the transport roller, the first sheet guide may move away from the second sheet guide.

The embodiments of the present disclosure have been described in detail with reference to the drawings; however, specific configurations of the disclosure are not limited to those in the embodiments and may be modified, substituted, or deleted, for example, without departing from the spirit of the disclosure.

What is claimed is:

1. A printing apparatus comprising:

a print head;

a roll sheet container configured to contain a roll sheet around which a recording sheet is wound;

a first sheet guide configured to make contact with a first surface of the recording sheet;

a second sheet guide configured to make contact with a second surface of the recording sheet, and disposed so as to face the first sheet guide to form a sheet route for the recording sheet, an entire sheet route extending from a position of separation of the recording sheet from the roll sheet to a printing site, wherein the second sheet guide includes a projection configured to protrude toward the roll sheet container and is upstream the first sheet guide in the entire sheet route, and a pushing section configured to extend from the projection in a direction away from the first sheet guide, and formed along an outer circumference of the roll sheet;

a transport roller configured to transport the recording sheet that passed along the sheet route; and a third sheet guide configured to make contact with the second surface of the recording medium, the third sheet guide being elongate with a surface of the third sheet guide configured to make contact with the second surface of the recording medium curving along an outer circumference of the transport roller, wherein, a surface of the first sheet guide which faces the recording sheet is at least partly curved along a surface of the second sheet guide which faces the recording sheet, the surface of the second sheet guide which faces the recording a sheet is curved so as to be farther from the transport roller in the horizontal direction on a downstream side in the transport direction compared with an upstream side in the transport direction, and a surface of a third sheet guide which faces the recording sheet is curved along the outer circumference of the transport roller, the third she et guide partly covers a surface of the transport roller, the third sheet guide being disposed downstream of the second sheet guide in a transport direction of the recording sheet.

2. The printing apparatus according to claim 1, further comprising a cover that covers or exposes the roll sheet container, wherein both the second sheet guide and the transport roller are disposed on the cover, and when the cover is closed, the first sheet guide and the second sheet guide face each other to form the sheet route.

3. The printing apparatus according to claim 1, wherein when making contact with the recording sheet being transported by the transport roller, the first sheet guide moves away from the second sheet guide.

* * * * *